(12) United States Patent
Foster et al.

(10) Patent No.: US 10,773,665 B2
(45) Date of Patent: Sep. 15, 2020

(54) SYSTEM AND METHOD FOR DETECTING A DAMAGE CONDITION ASSOCIATED WITH AN AGRICULTURAL MACHINE

(71) Applicant: CNH Industrial America LLC, New Holland, PA (US)

(72) Inventors: Christopher A. Foster, Mohnton, PA (US); Joshua David Harmon, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/161,314

(22) Filed: Oct. 16, 2018

(65) Prior Publication Data
US 2020/0114843 A1 Apr. 16, 2020

(51) Int. Cl.
| | | |
|---|---|---|
| *B60Q 1/00* | (2006.01) |
| *B60R 16/023* | (2006.01) |
| *A01D 75/18* | (2006.01) |
| *A01D 34/00* | (2006.01) |
| *B60W 50/14* | (2020.01) |
| *G07C 5/08* | (2006.01) |
| *G07C 5/12* | (2006.01) |
| *A01B 63/111* | (2006.01) |

(52) U.S. Cl.
CPC ........ *B60R 16/0232* (2013.01); *A01B 63/111* (2013.01); *A01D 34/008* (2013.01); *A01D 75/18* (2013.01); *B60W 50/14* (2013.01); *G07C 5/0825* (2013.01); *G07C 5/0833* (2013.01); *G07C 5/12* (2013.01); *B60W 2050/143* (2013.01); *B60W 2050/146* (2013.01); *B60W 2300/15* (2013.01)

(58) Field of Classification Search
CPC . B60R 16/0232; A01B 63/111; A01D 34/008; A01D 75/18; B60W 50/14; G07C 5/0825; G07C 5/0833; G07C 5/12
See application file for complete search history.

(56) References Cited

U.S. PATENT DOCUMENTS

| | | |
|---|---|---|
| 4,878,543 A | 11/1989 | Kauss |
| 4,886,123 A | 12/1989 | Arnold et al. |
| 5,755,291 A | 5/1998 | Orbach et al. |

(Continued)

*Primary Examiner* — Phung Nguyen
(74) *Attorney, Agent, or Firm* — Rebecca L. Henkel; Richard K. DeMille (57) ABSTRACT

A system for detecting a damage condition associated with an agricultural machine. The system can include a component of the agricultural machine and a movement sensor configured to measure a movement parameter associated with the component. The system can include a controller communicatively coupled with the movement sensor. The controller can include a processor and associated memory. The memory may store instructions that, when executed by the processor, configure the controller to perform operations. The operations may include monitoring the movement parameter associated with the component and detecting a change in the monitored movement parameter over time that is associated with a damage pattern. The damage pattern may be indicative of damage to the agricultural machine. The operations may include automatically initiating a corrective action associated with preventing further damage to the agricultural machine when it is detected that the monitored movement parameter has experienced the damage pattern.

20 Claims, 7 Drawing Sheets

(56) References Cited

U.S. PATENT DOCUMENTS

| | | | |
|---|---|---|---|
| 5,911,769 A | 6/1999 | Orbach et al. | |
| 7,142,956 B2 | 11/2006 | Heiniger et al. | |
| 7,313,472 B2 | 12/2007 | Schick et al. | |
| 8,155,844 B2 | 4/2012 | Peters | |
| 8,352,116 B2 | 1/2013 | Boylston et al. | |
| 8,533,018 B2 * | 9/2013 | Miwa | E02F 9/20 |
| | | | 705/7.13 |
| 9,380,742 B2 | 7/2016 | Biber et al. | |
| 9,459,097 B2 | 10/2016 | Davey et al. | |
| 9,706,708 B2 | 7/2017 | Smith et al. | |
| 9,714,884 B2 * | 7/2017 | Hofer | G01M 15/12 |
| 9,761,027 B2 * | 9/2017 | Williams | G06T 11/206 |
| 9,901,031 B2 * | 2/2018 | Mott | A01D 41/1274 |
| 9,934,538 B2 * | 4/2018 | Hunt | A01D 41/127 |
| 2006/0020402 A1 * | 1/2006 | Bischoff | G07C 3/00 |
| | | | 702/34 |
| 2006/0243055 A1 | 11/2006 | Sundermeyer et al. | |
| 2008/0195268 A1 | 8/2008 | Sapilewski et al. | |
| 2013/0289832 A1 | 10/2013 | Pirotais | |
| 2014/0000919 A1 | 1/2014 | Bachman et al. | |
| 2015/0077557 A1 | 3/2015 | Han et al. | |
| 2017/0086348 A1 | 3/2017 | Schleyer et al. | |
| 2017/0094894 A1 | 4/2017 | Heim et al. | |
| 2017/0118901 A1 | 5/2017 | Stark | |
| 2018/0084723 A1 | 3/2018 | Gresch et al. | |
| 2018/0092295 A1 | 4/2018 | Sugumaran et al. | |
| 2018/0116096 A1 | 5/2018 | Gresch et al. | |
| 2018/0116102 A1 | 5/2018 | Taylor et al. | |
| 2018/0168094 A1 | 6/2018 | Koch et al. | |
| 2018/0190045 A1 * | 7/2018 | Richard | B62D 55/26 |
| 2018/0206387 A1 | 7/2018 | Stark | |

* cited by examiner

SYSTEM AND METHOD FOR DETECTING A DAMAGE CONDITION ASSOCIATED WITH AN AGRICULTURAL MACHINE

FIELD

The present subject matter relates generally to agricultural machines and, more particularly, to a system and method for detecting a damage condition associated with an agricultural machine, such as detecting damage of a ground-engaging implement of an agricultural implement or agricultural vehicle.

BACKGROUND

A wide range of agricultural implements have been developed and are presently in use for tilling, cultivating, harvesting, and so forth. Tillage implements, for example, are commonly towed behind tractors and may cover wide swaths of ground that include various types of residue. Accordingly, tillers typically include ground-engaging tools, such as shanks and tillage points, configured to condition the soil for improved moisture distribution while reducing soil compaction from such sources as machine traffic, grazing cattle, and standing water.

During tillage operations, various ground-engaging tools may impact a large impediment, such as a large rock, root, or other object within the ground. Such impacts can damage the ground-engaging tool and/or associated structure of the agricultural machine, such as a frame component of the agricultural machine. As a result, catastrophic failure of a component of the agricultural machine may occur yet remain undetected until a later time, such as an inspection of the agricultural machine after the tillage operation is complete. Continued operation of the tillage implement after the catastrophic failure can result in additional damage to the ground-engaging tool and/or associated structure.

Similarly, ground-engaging tools and/or associated structure can be repeatedly or cyclically stressed during tillage operations in a manner that can produce fatigue and/or crack growth. Such progressive failures may remain undetected and worsen until a later catastrophic failure occurs.

Accordingly, an improved system and method for detecting a damage condition associated with an agricultural machine that overcomes one or more of the issues in the prior art would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a system for detecting a damage condition associated with an agricultural machine. The system can include a component of the agricultural machine and a movement sensor configured to measure a movement parameter associated with the component. The system can include a controller communicatively coupled with the movement sensor. The controller can include a processor and associated memory. The memory may store instructions that, when executed by the processor, configure the controller to perform operations. The operations may include monitoring the movement parameter associated with the component and detecting a change in the monitored movement parameter over time that is associated with a damage pattern. The damage pattern may be indicative of damage to the agricultural machine. The operations may include automatically initiating a corrective action associated with preventing further damage to the agricultural machine when it is detected that the monitored movement parameter has experienced the damage pattern.

In one aspect, the present subject matter is directed to a method for detecting a damage condition associated with an agricultural machine. The method may include monitoring, by one or more computing devices, a movement parameter associated with a component of the agricultural machine. The method may include detecting, by the one or more computing devices, a change in the monitored movement parameter over time that is associated with a damage pattern. The damage pattern may be indicative of damage to the agricultural machine. The method may include automatically initiating, by the one or more computing devices, a corrective action associated with preventing further damage to the agricultural machine when it is detected that the monitored movement parameter has experienced the damage pattern.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting a damage condition associated with an agricultural machine. In several embodiments, the damage condition may be detected by monitoring a movement parameter associated with one or more components of the agricultural machine. Example components may include ground-engaging tools, associated structural components, and/or other connecting or coupling components (e.g., fasteners, bearings, etc.)

An accelerometer or other suitable movement sensor may be configured to monitor the movement parameter associated with the component. Example movement parameters include acceleration, velocity, position, and/or one or more components of a frequency-band analysis thereof. A change may be detected in the movement parameter over time that is associated with a damage pattern, which may be indicative of damage to the agricultural machine. For example, a ground-engaging tool may impact a large rock, bolder, or root. Such an impact may cause a large spike in the acceleration of the ground-engaging tool and/or associated structure. The damage pattern may be represented by such a spike. It should be understood that the damage pattern may be represented by a variety of different patterns of the monitored movement parameter as described herein. The various damage patterns may be indicative of different types of damage conditions and/or failure events, such as catastrophic failure events and/or progressive failure events.

When it is detected that the monitored movement parameter has experienced the damage pattern, a corrective action may automatically be initiated that is associated with preventing further damage to the agricultural machine. Example corrective actions include reducing the speed of the agricultural machine (e.g., stopping the agricultural machine) and/or providing a notification to an operator or supervisor of the agricultural machine.

Automatically initiating the corrective action may prevent further damage to the agricultural machine and/or associated equipment. As an example, if a catastrophic failure event (e.g., fracture, plastic deformation, etc.) is detected, the corrective action may prevent continued operation of the agricultural machine immediately after the event, which could cause more damage to the agricultural machine. Instead, the operator may inspect the agricultural machine for damage upon detection of the catastrophic failure event and/or take other actions to prevent additional damage, such as repairing components of the agricultural machine that are at risk for further damage.

As another example, progressive failure (e.g., crack propagation, fatigue, etc.) may be detected before a catastrophic failure occurs. Such detection and corrective action may prevent the progressive failure from worsening and may thereby prevent a catastrophic failure from occurring.

Additionally, although described with reference to a tillage implement, it should be understood that the systems and methods described herein may find application with any suitable agricultural machine. Examples include any suitable agricultural vehicle (e.g., harvester) and/or any suitable type of agricultural implement, such as such as a seeder, planter, fertilizer, etc. Aspects of the present disclosure may find application with any agricultural machine for which damage detection would be useful.

Figure 1:
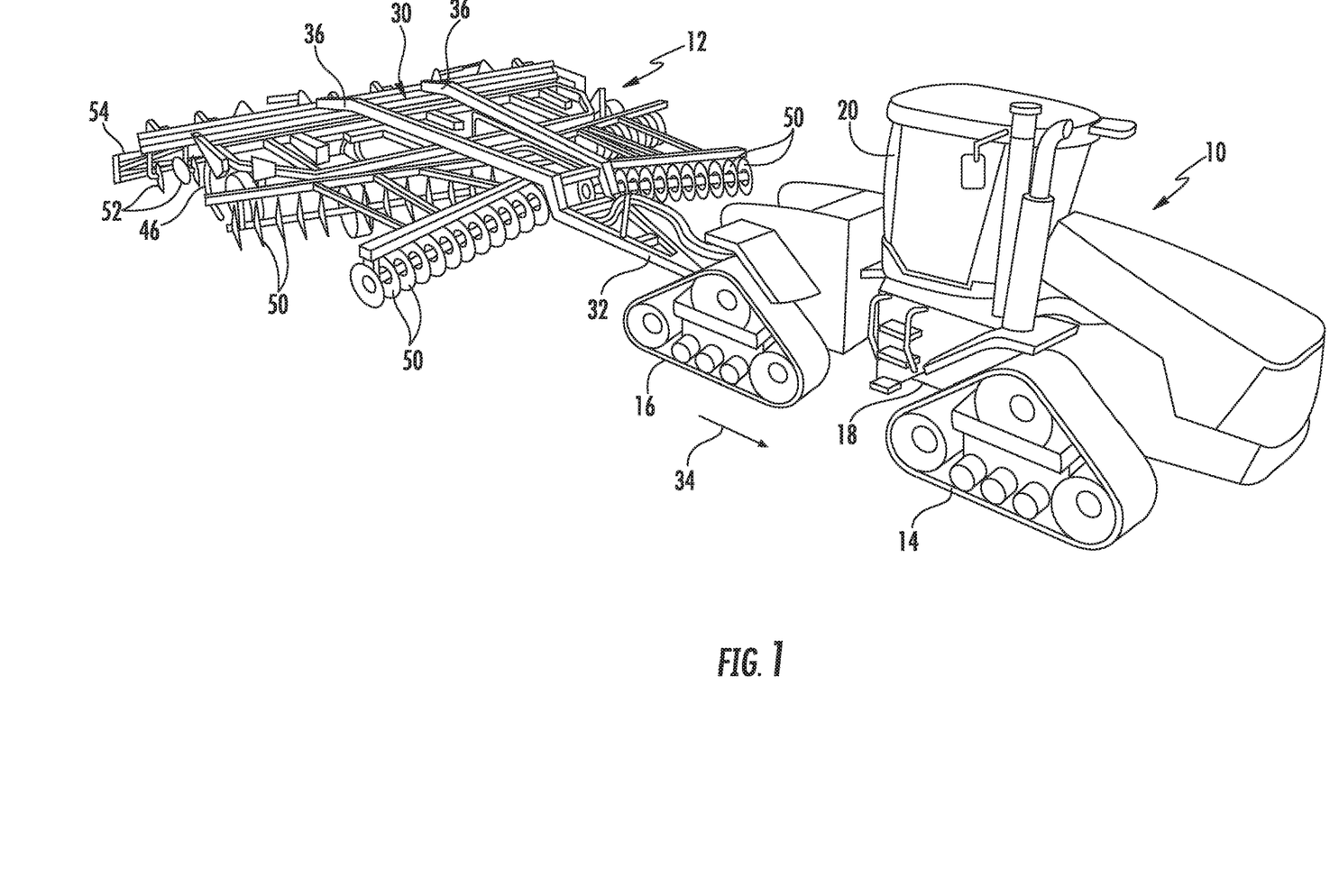
FIG. 1 illustrates a perspective view of one embodiment of a work vehicle towing a tillage implement in accordance with aspects of the present subject matter.
Figure 2:
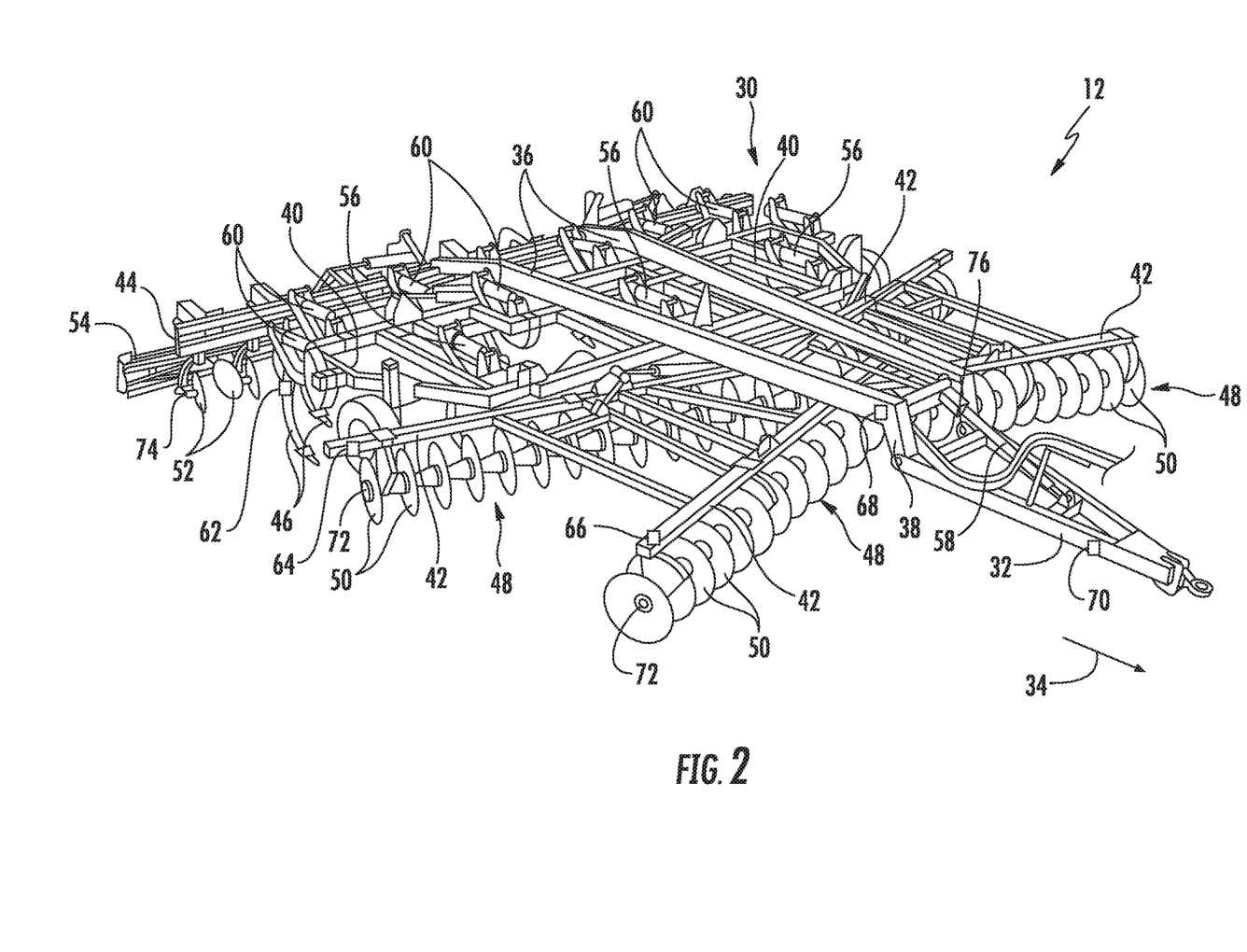
FIG. 2 illustrates a perspective view of the tillage implement shown in FIG. 1.

Referring now to drawings, FIGS. 1 and 2 illustrate perspective views of one embodiment of a work vehicle 10 and an associated agricultural tillage implement 12 in accordance with aspects of the present subject matter. Specifically, FIG. 1 illustrates a perspective view of the work vehicle 10 towing the tillage implement 12 (e.g., across a field). Additionally, FIG. 2 illustrates a perspective view of the tillage implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine and a transmission mounted on the chassis 18. The transmission may be operably coupled to the engine and may provide variably adjusted gear ratios for transferring engine power to the track assemblies 14, 16 via a drive axle assembly (not shown) (or via axles if multiple drive axles are employed).

Additionally, as shown in FIGS. 1 and 2, the tillage implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the tillage implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the tillage implement 12 may also include any number of suitable actuators (e.g., hydraulic cylinders) for adjusting the relative positioning, penetration depth, and/or up/down force associated with the various ground-engaging tools 46, 50, 52, 54. For instance, the tillage implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the tillage implement 12 may include one or more second actuators 58 coupled to the disk forward frame 42 to adjust the penetration depth and/or the down pressure of the disk blades 50 (also referred to herein interchangeably as the front disk gangs). Moreover, the tillage implement 12 may include one or more third actuators 60 coupled to the aft frame 44 to allow the aft flame 44 to be moved relative to the central frame 40, thereby allowing the relevant operating parameters of the ground-engaging tools 52, 54 supported by the aft frame 44 (e.g., the down pressure and/or the penetration depth).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the tillage implement 12 described above and shown in FIGS. 1 and 2 is only provided for exemplary purposes. Thus, it should be appreciated that the present subject matter may be readily adaptable to any manner of tillage implement configuration. For example, as indicated above, each frame section of the tillage implement 12 may be configured to support any suitable type of ground-engaging tools, such as by installing closing disks on the aft frame 44 of the tillage implement 12.

In some embodiments, the tillage implement 12 may include one or more movement sensor(s) 62, 64, 66, 68 configured to measure a movement parameter associated with a component of the tillage implement 12. For example, the movement sensor(s) 62, 64, 66, 68 may include accelerometers, acoustic sensors, position-based sensors, and/or any other configuration of sensor that is suitable for measuring a movement parameter that describes movement of a component of the tillage implement 12.

Referring to FIG. 2, the movement sensor(s) 62, 64, 66, 68, 70 may be coupled with or installed on the tillage implement 12 in a variety of locations that are suitable for measuring movement of the various components of the tillage implement 12. In some embodiments, the movement sensor(s) 62, 64, 66, 68, 70 may be coupled at locations that are particularly suited for measuring the movement of one or more ground-engaging tools 46, 50, 52, 54 and/or supporting structure, such as one or more components of the carriage frame assembly 30 of the tillage implement 12. As an example, the movement sensor(s) 62, 64, 66, 68, 70 may be positioned at suitable location(s) for measuring movement of at least one of the ground-engaging shanks 46, disk blades 50, leveling blades 52, or rolling (or crumbler) baskets 54. More specifically, the movement sensor(s) 62, 64, 66, 68, 70 may be coupled directly to the ground-engaging tools 46, 50, 52, 54 and/or coupled to a component of the implement 12 that supports one or more of the ground-engaging tools 46, 50, 52, 54. Example suitable locations include being coupled directly to one of the ground-engaging shanks 46 (movement sensor 62); coupled to the forward frame 42 (movement sensor(s) 64, 66); coupled to the aft extending carrier frame members 36 or the tow bar 32 (movement sensor(s) 68, 70).

As another example, in some embodiments, one or more movement sensors may include or be coupled to at least one of an axle or pin connecting two components of the tillage implement 12. A movement sensor may include or be coupled to an axle 72 that rotatably supports a disk blade 50 and/or an axle 74 that rotatably supports a leveling blade 52. Other examples include axles that support the rolling baskets 54, and/or one or more of the pins 72 that pivotally couples the tow bar 32 to the aft extending carrier frame members 36. It should be understood that the movement sensor may be coupled at any location for monitoring movement of a component of the agricultural machine that is suitable for detecting a damage condition associated with the component.

Figure 3:
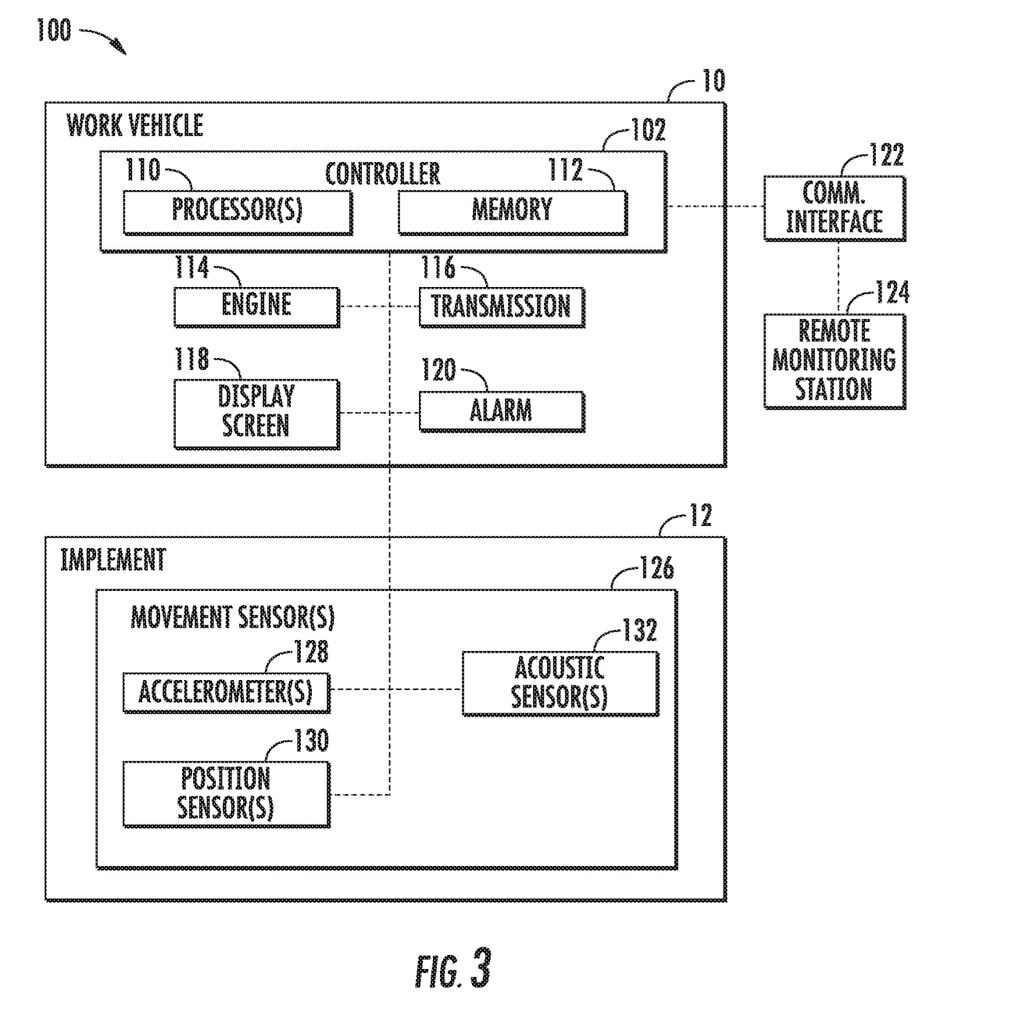
FIG. 3 illustrates a schematic view of one embodiment of a system for detecting a damage condition associated with an agricultural machine in accordance with aspects of the present subject matter.

Referring now to FIG. 3, a schematic view of one embodiment of a system 100 for detecting a damage condition associated with an agricultural machine is illustrated in accordance with aspects of the present subject matter. In general, the agricultural machine may include any agricultural implement or agricultural vehicle configured to perform or assist with the performance of an agricultural operation. The system 100 will be described herein with reference to the work vehicle 10 and the tillage implement 12 described above with reference to FIGS. 1 and 2. However, it should be appreciated that the disclosed system 100 may generally be configured to detect a damage condition associated with any suitable agricultural machine, including any suitable agricultural vehicle (e.g., harvester), and/or any suitable type of agricultural implement, such as such as a seeder, planter, fertilizer, etc.

In several embodiments, the system 100 may include a controller 102. The controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data that can be retrieved, manipulated, created and/or stored by the processor(s) 110 and instructions that can be executed by the processor(s) 110.

It should be understood that the controller 102 may be located in a variety of locations and/or have a variety of configurations. For example, the controller 102 may correspond with an implement controller that is mounted to the implement 12; a vehicle controller that is mounted to the work vehicle 10; or a combination thereof. The operations described herein may be performed solely by the implement controller, solely by the vehicle controller, or performed by a combination thereof. The implement controller and vehicle controller may be configured to communicate (e.g., via wired or wireless communication) to perform the operations described herein. In other words, the controller 102 that is schematically represented in FIG. 3 may represent the implement controller, the vehicle controller, or both.

In some embodiments, the agricultural machine may include an engine 114 and/or a transmission 116. The transmission 144 may be operably coupled to the engine 114 and may provide variably adjusted gear ratios for transferring engine power to the wheels via a differential (not shown). In some embodiments, the engine 114 and transmission 116 may correspond to the engine and a transmission of the work vehicle 10, which is configured to tow the tillage implement 12. In other embodiments, the agricultural machine may be or include an agricultural vehicle configured to perform an agricultural operation (e.g., a harvester). In such embodiments the engine 114 and transmission 116 may correspond to the engine and transmission of the harvester.

In some embodiments, the system 100 may include a display screen 118 and/or an alarm 120 configured to provide a notification to an operator and/or a supervisor of the agricultural machine. For example, the display screen 118 may be located in the cab 20 of the work vehicle 10. The alarm 120 may be or include a light and/or speaker configured to illuminate or produce an audible alarm to alert the driver of the detected damage condition.

In some embodiments, the agricultural machine may be autonomous or semi-autonomous. In such embodiments, the notification may be provided via a communication interface 122 to a remote monitoring station 124, for example, to a supervisor of the autonomous or semi-autonomous agricultural machine. The communication interfaces 122 may be configured to wirelessly transmit and/or receive data via any suitable network, such as a local wireless network using any suitable wireless communications protocol (e.g., Wi-Fi, Bluetooth, and/or the like) and/or a broader network, such as a wide-area network (WAN), using any suitable communications protocol (e.g., TCP/IP, HTTP, SMTP, FTP).

The agricultural machine (e.g., the tillage implement 12) may include at least one movement sensor(s) 126 configured to measure a movement parameter associated with a component of the agricultural machine. For example, the movement sensor(s) may include accelerometer(s) 128, position-based sensor(s) 130, and/or acoustic sensor(s) 132, for example as described above with reference to FIG. 2.

Figure 4A:
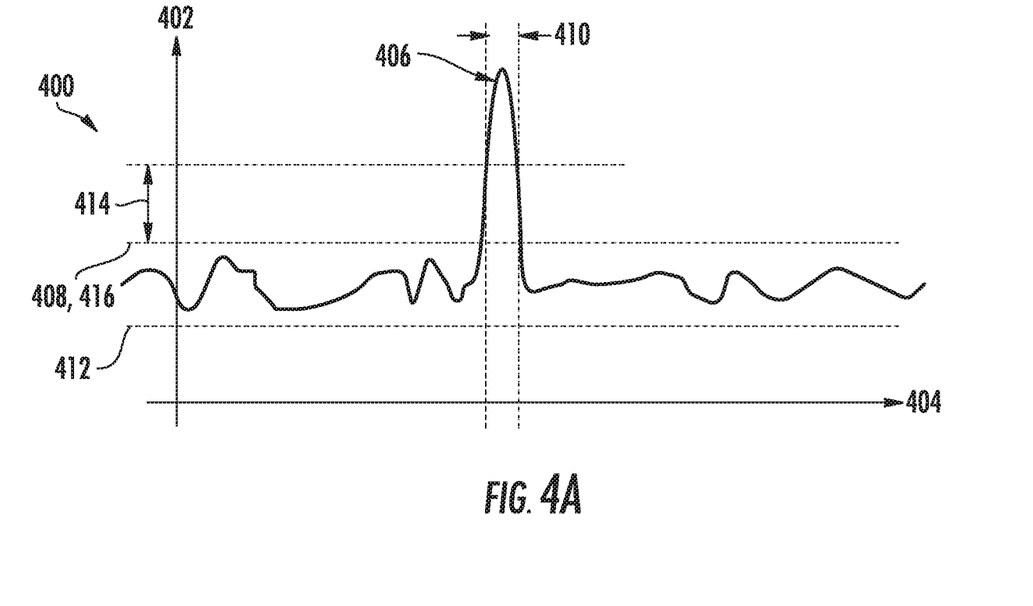
FIGS. 4A through 4C illustrate time-varying plots of a movement parameter associated with a component of the agricultural machine that may be indicative of a catastrophic failure event in accordance with aspects of the present subject matter.

FIG. 4A illustrates a time-varying plot of a movement parameter 402 over time 404 indicative of a catastrophic failure event. A damage pattern 406 may indicate that a damage condition has occurred. For example, the damage pattern 406 may be indicative of at least one of an impact with the agricultural machine, a sudden structural failure of the agricultural machine, an incipient structural failure of the agricultural machine, or a plastic deformation of the agricultural machine. For instance, when performing a tillage operation, an object, such as a rock, may impact one of the ground-engaging tools of the tillage implement. The impact may be sufficiently severe to damage the tillage implement, such as by causing a sudden structural failure (e.g., a fracture) in the ground-engaging tool or a structure supporting the ground-engaging tool. Such an event may be reflected in the movement of the component of the implement as the damage pattern 406.

For example, the damage pattern 406 may include a large pulse or increase in the movement parameter 402 caused by an impact or fracture of a component (e.g., a ground-engaging tool) of the implement. As an example, the damage pattern 406 may be represented by the monitored movement parameter 402 increasing beyond a first predetermined threshold value 408. Additionally, in some embodiments, the damage pattern 406 may be represented by the monitored movement parameter 402 increasing beyond the first predetermined threshold value 408 across a first predetermined time interval 410. The damage pattern 406 may also include the movement parameter 402 decreasing to less than the first predetermined threshold value 408.

In some embodiments, the damage pattern 406 may be represented by the monitored movement parameter 402 deviating from a baseline operating range by at least a second predetermined threshold value 414, which may be defined with respect to the baseline operating range. The baseline operating range may be defined between a lower limit 412 and an upper limit 416. The baseline operating range may be defined as a range within which the monitored movement parameter 402 generally remains during normal operation of the implement.

Figure 4B:
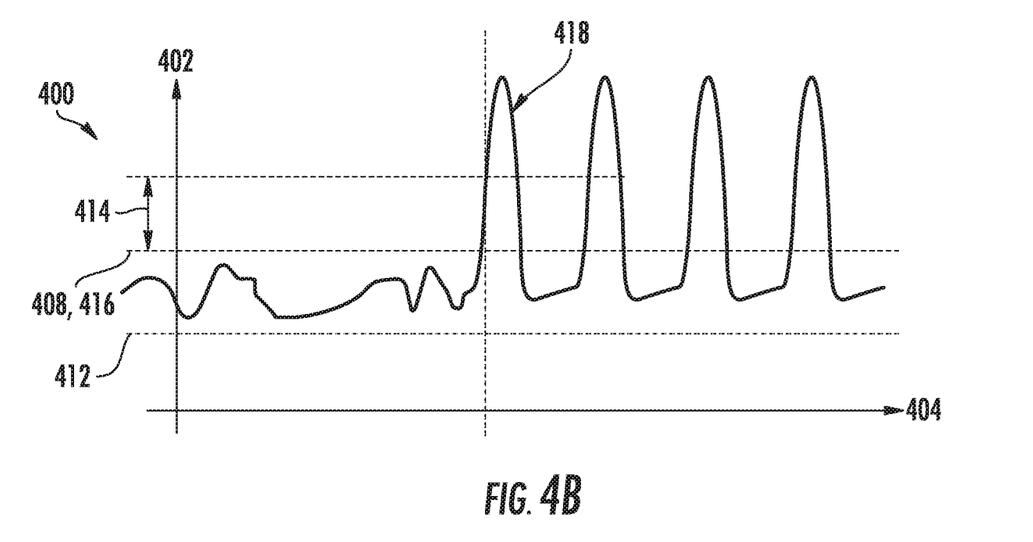

FIG. 4B illustrates another time-varying plot of the movement parameter 402 over time 404 indicative of a catastrophic failure event. In some instances, a component of the agricultural machine that rotates may fail. In such instances, the movement parameter 402 may exhibit a series of repeating pulses or rapid increases as the component continues to rotate. In some embodiments, a damage pattern 418 may be defined that includes such repeating pulses. Such pulses may be defined in a similar manner as described above regarding the damage pattern 406 of FIG. 4B. For example, the damage pattern 418 may be defined with respect to the first or second predetermined thresholds 408, 414 and/or baseline operating range (e.g., upper and lower bounds 412, 416) and/or with respect to a time spent above at least one of the first or second predetermined thresholds 408, 414, as described above.

Figure 4C:
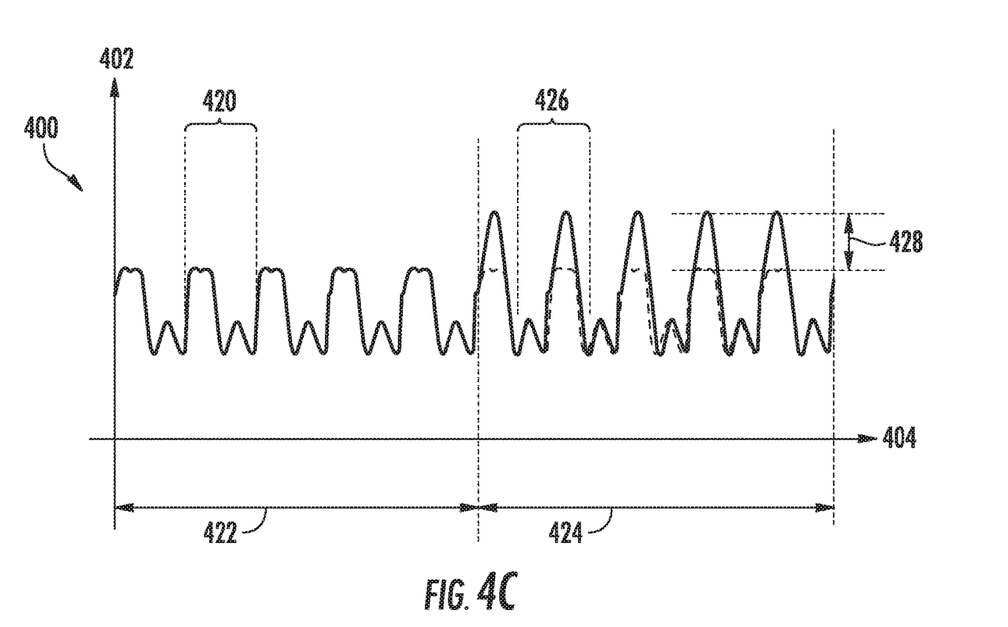

FIG. 4C illustrates another time-varying plot of the movement parameter 402 over time 404 that is indicative of a catastrophic failure event. In some embodiments, the movement parameter may exhibit a baseline repeating pattern 420 in a first time period 422. During a second time period 424, the monitored movement parameter 402 may exhibit a second repeating pattern 426 that deviates from the baseline repeating pattern 420. For example, the second repeating pattern 426 may deviate from the baseline repeating pattern 420 by at least a predetermined threshold value 428 with respect to the baseline repeating pattern 420. This deviation may be caused by the component fracturing or otherwise failing, for example as a result of an impact. Additionally or alternatively, this deviation may also be caused a bearing, fastener, or the like associated with the rotating component loosening, fracturing, or otherwise failing.

In some embodiments, the repeating pattern of the monitored movement parameter 402 may gradually change in a manner that is indicative of a progressive failure event. For example, deviation between the repeating pattern and the baseline repeating pattern 420 may gradually increase, in contrast with a sudden change as described above. Such a gradual change in the repeating pattern may indicate that a rotating component or associated structure is experiencing fatigue, crack growth, and/or incremental plastic deformation. Thus, the damage pattern may describe such types of progressive failure events.

Figure 4D:
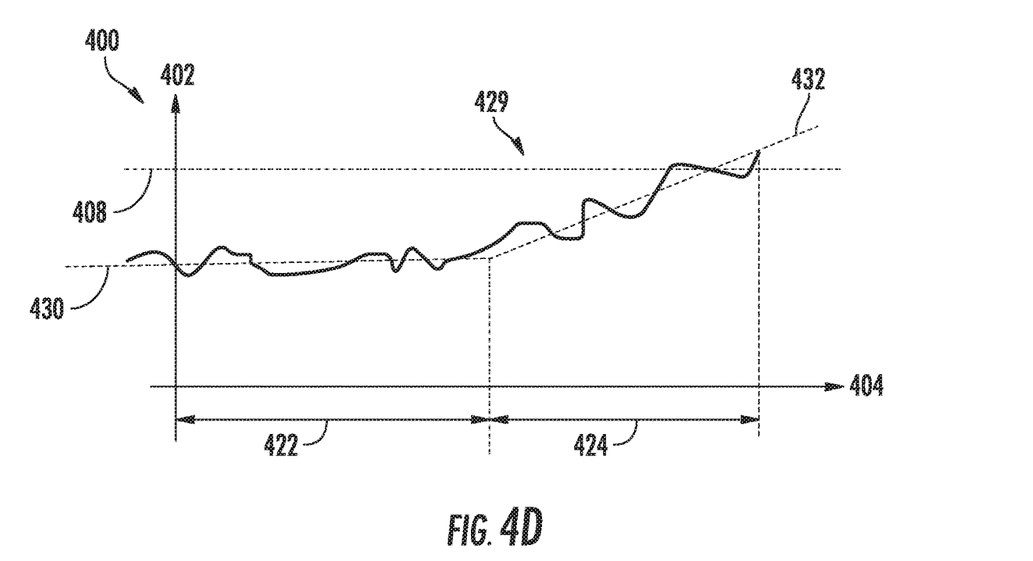
FIGS. 4D and 4E illustrate time-varying plots of a movement parameter associated with a component of the agricultural machine that may be indicative of a progressive failure event in accordance with aspects of the present subject matter.

FIG. 4D illustrates a time-varying plot of the movement parameter 402 over time 404 that is indicative of an occurrence of a progressive failure event. A damage pattern 429 may be represented by a progressive failure trend. In some embodiments, the damage pattern 429 may be represented by a change in a moving average of the movement parameter 402. As an example, the movement parameter 402 may have a relatively constant moving average value 430 over a first time period 422. During the second time period 424, the moving average 432 of the movement parameter 402 may then start increasing. This progressive failure trend may indicate a potential progressive failure event.

Progressive failure can include fatigue (e.g., crack growth, plastic deformation etc.) of a component of the agricultural machine. Progressive failure can also include loosening and/or wearing of a fastener and/or bearing of the agricultural machine. For instance, as a bearing of a rotatably mounted component wears, the movement parameter may exhibit a damage pattern as described herein, for example with reference to FIGS. 4D and 4E.

Additionally, in some embodiments, the damage pattern may be represented by a change in one or more of a variety of suitable characteristics other than moving average. Examples include spectral energy, average standard deviation, average peak-to-trough amplitude, the presence a harmonic frequency associated with a failure condition, the absence of a harmonic frequency associated with normal or baseline operation, etc.

Figure 4E:
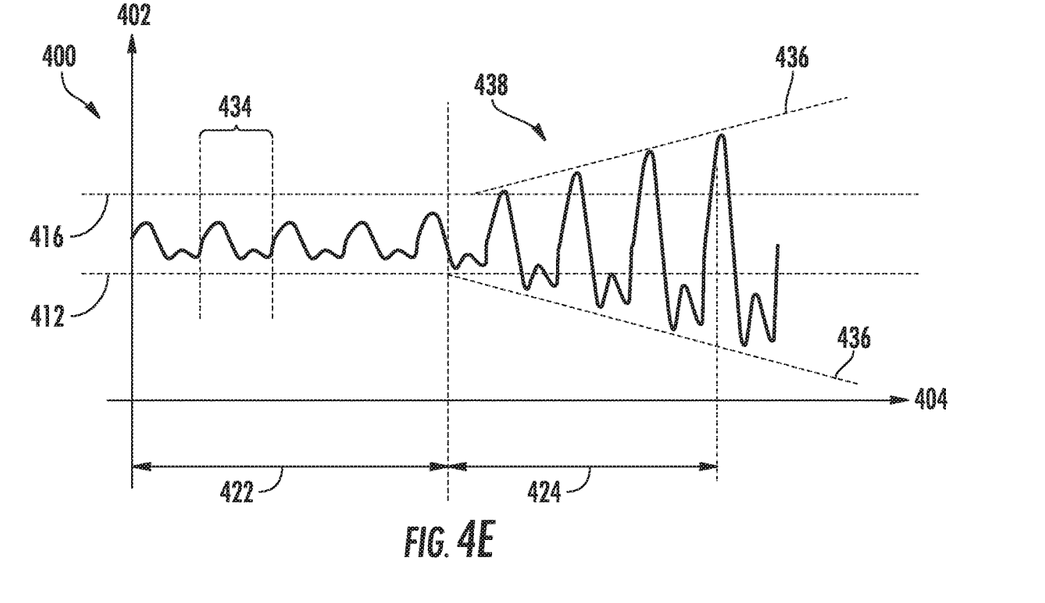

FIG. 4E illustrates another time-varying plot of the movement parameter 402 over time 404 that is indicative of an occurrence of a progressive failure event. For example, during the first time period 422, the movement parameter 402 may exhibit a repeating pattern 434. A baseline operating range may be defined between a lower limit 412 and an upper limit 416, for example as described above with reference to FIG. 4E. During the second time period 424, the repeating pattern may become more pronounced and/or have an increasing amplitude (represented by diverging dotted lines 436). This progressive failure trend may indicate the occurrence of the progressive failure event. For instance, a bearing, fastener, or the like associated with a rotating component may begin to wear, loosen, or otherwise fail. A damage pattern 438 may be represented by such a change or trend in the movement parameter 402.

The various parameters and thresholds described above may be determined or selected theoretically or empirically. For example, movement parameter data may be collected and correlated with failure events. Such correlations may be used to select the parameters and thresholds. In some embodiments, machine learning techniques may be employed to select one or more of the thresholds or ranges associated with the damage pattern. Alternatively, machine learning techniques may be employed to directly define the damage pattern itself. For example, a machine learned model may be trained using a training data set. The training data set may include empirically collected movement parameter data. At least one damage condition or failure event may occur during collection of the movement parameter data of the training data set. The training data set may include one or more labels describing the location(s) (e.g., time(s)) of such damage conditions or failure events within the movement parameter data.

Figure 5:
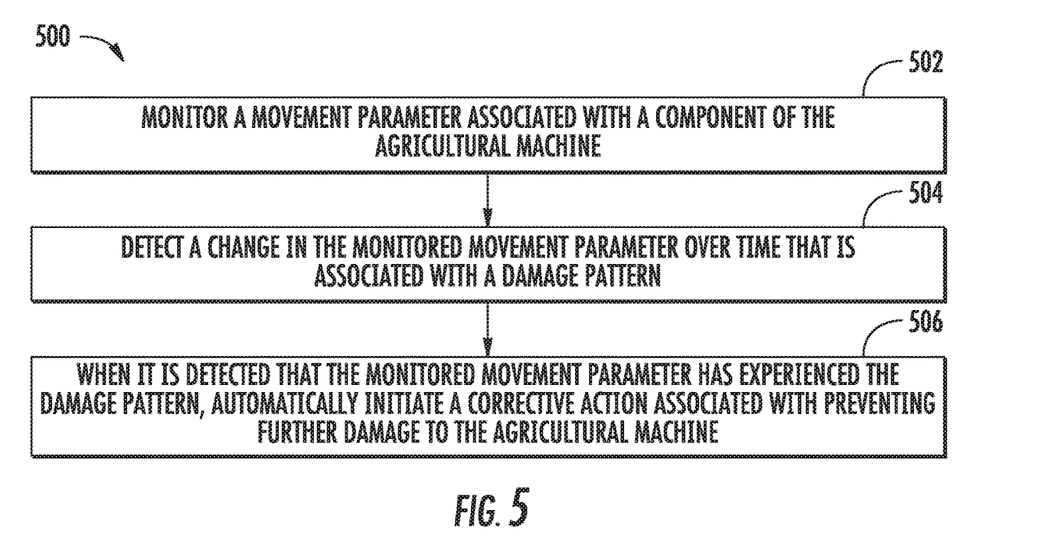
FIG. 5 illustrates a flow diagram of one embodiment of a method for detecting a damage condition associated with an agricultural machine in accordance with aspects of the present subject matter.

FIG. 5 illustrates a flow diagram of one embodiment of a method 400 for detecting a damage condition associated with an agricultural machine in accordance with aspects of the present subject matter. In general, the method 200 will be described herein with reference to the work vehicle 10 and the tillage implement 12 shown in FIGS. 1 and 2, as well as the various system components shown in FIG. 3. However, it should be appreciated that the disclosed method 200 may be implemented with any suitable agricultural machine, including any suitable agricultural vehicle (e.g., harvester), and/or any suitable type of agricultural implement, such as a seeder, planter, fertilizer, etc.

In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (502), the method 200 may include monitoring a movement parameter associated with a component of the agricultural machine. For example, the controller 102 (e.g., an implement controller or a vehicle controller) may be communicatively coupled with one or more movement sensors 126 as described above with reference to FIG. 3. The movement sensors 126 may correspond with one or more of the movement sensor(s) 62, 64, 66, 68, 70 described above with reference to FIG. 2 and may be coupled at locations that are particularly suited for measuring the movement of one or more ground-engaging tools 46, 50, 52, 54 and/or supporting structure, for example as described above with reference to FIG. 2. Additionally, the movement sensor(s) 126 may include a variety of suitable sensors, including accelerometers, acoustic sensors, position-based sensors, and/or any other configuration of sensor that is suitable for measuring a movement parameter that described movement of a component of the tillage implement.

The movement parameter may include at least one of acceleration, velocity, position, and/or one or more components of a frequency-band analysis thereof. For example, in some embodiments, a frequency-band analysis (e.g., Fast Fourier Transform) may be performed on acceleration information associated with a component of the agricultural machine. The movement parameter may include an amplitude of the frequency-band analysis in a particular frequency band of interest (e.g., a frequency associated with rotation of a rotating component, vibration of a component once fractured or damaged, etc.).

The method 200 may include, at (504), detecting a change in the monitored movement parameter over time that is associated with a damage pattern. The damage pattern may be indicative of damage to the agricultural machine, for example as described with reference to FIGS. 4A through 4E.

In some embodiments, the damage pattern may be indicative of at least one of a catastrophic failure event or a progressive failure event. As an example, the damage pattern may be indicative of an impact with the agricultural machine, such as component thereof (e.g., a ground engaging tool). The damage pattern may also be indicative of a sudden structural failure (e.g., a fracture of a component) of the agricultural machine. The damage pattern may also be indicative of an incipient structural failure of the agricultural machine, such as fatigue and/or crack growth associated with a component thereof. The damage pattern may also be indicative of plastic deformation of a component of the ground engaging tool.

In some embodiments, the method (500) may further include establishing at least one of a baseline operating range or a baseline repeating pattern of the monitored movement parameter, for example as described above with reference to FIGS. 4A through 4E. The damage pattern may be represented by the monitored movement parameter deviating from the baseline operating range or the baseline repeating pattern by at least a predetermined threshold value.

In some embodiments, the method (500) may further include detecting a progressive failure trend in the monitored movement parameter, for example as described above with reference to FIGS. 4D and/or 4E. The damage pattern may be represented by the progressive failure trend such that the detecting the progressive failure trend is indicative of the damage condition occurring.

The method (500) may include, at (506), when it is detected that the monitored movement parameter has experienced the damage pattern, automatically initiate a corrective action associated with preventing further damage to the agricultural machine. In some embodiments, automatically initiating the corrective action may include reducing a speed of the agricultural machine and/or providing a notification to at least one of an operator or a supervisor of the agricultural machine. As an example, the agricultural machine may be autonomous or semi-autonomous, and the controller 102 may be configured to automatically reduce the speed of the agricultural machine until the agricultural machine stops moving. The controller 102 (e.g., an implement controller, vehicle controller, or both) may be configured to communicate via the communication interface 122 with a remote monitoring station 124 to provide a notification to a supervisor of the autonomous or semi-autonomous agricultural machine.

As another example, the agricultural machine may be operated by an operator, and the controller 102 may be configured to provide a notification to the operator via at least one of the display screen 118 or the alarm 120. The notification may include a variety of visual and/or audible signals. For example, the display screen 118 may produce a visual signal (e.g., text, image, moving graphic, etc.) and/or the alarm 120 may produce an audible signal (e.g., siren, speech notification, etc.) configured to alert the operator of the agricultural machine of the detected damage condition.

Initiating the corrective action as describe herein may prevent further damage to the agricultural machine, thereby reducing maintenance and/or repair costs associated with operating the agricultural machine. Additionally, aspects of the present disclosure may provide increased security for operators of agricultural machine.

It is to be understood that the steps of the method 500 may be performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 500, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting a damage condition associated with an agricultural machine, the system comprising:
   a component of the agricultural machine;
   a movement sensor configured to measure a movement parameter associated with the component; and
   a controller communicatively coupled with the movement sensor, the controller including a processor and associated memory, the memory storing instructions that, when executed by the processor, configure the controller to:
   monitor the movement parameter associated with the component;
   detect a change in the monitored movement parameter over time that is associated with a damage pattern, the damage pattern being indicative of damage to the agricultural machine; and
   when it is detected that the monitored movement parameter has experienced the damage pattern, automatically initiate a corrective action associated with preventing further damage to the agricultural machine, wherein automatically initiating the corrective action comprises automatically reducing a speed of the agricultural machine based on detecting the damage pattern.

2. The system of claim 1, wherein the damage pattern is indicative of a catastrophic failure event.

3. The system of claim 1, wherein the damage pattern is indicative of a progressive failure event.

4. The system of claim 1, wherein the damage pattern is indicative of at least one of:
an impact with the agricultural machine;
a sudden structural failure of the agricultural machine;
an incipient structural failure of the agricultural machine; or
a plastic deformation of the agricultural machine.

5. The system of claim 1, wherein the component comprises a ground engaging tool.

6. The system of claim 1, wherein the movement sensor comprises an accelerometer.

7. The system of claim 1, wherein the corrective action comprises providing a notification to at least one of an operator or a supervisor of the agricultural machine.

8. The system of claim 1, wherein the damage pattern is represented by the monitored movement parameter increasing beyond a predetermined threshold value.

9. The system of claim 1, wherein the damage pattern is represented by the monitored movement parameter increasing beyond a predetermined threshold value across a first predetermined time interval, followed by a decrease in the monitored movement parameter to less than the predetermined threshold value.

10. The system of claim 1, wherein the controller is further configured to establish a baseline operating range of the monitored movement parameter, and wherein the damage pattern is represented by the monitored movement parameter deviating from the baseline operating range by at least a predetermined threshold value.

11. The system of claim 1, wherein the controller is further configured to establish a baseline repeating pattern of the monitored movement parameter, and wherein the damage pattern is represented by the monitored movement parameter deviating from the baseline repeating pattern by at least a predetermined threshold value.

12. The system of claim 1, wherein the controller is further configured to detect a progressive failure trend in the monitored movement parameter, and wherein the damage pattern is represented by the progressive failure trend.

13. A method for detecting a damage condition associated with an agricultural machine, the method comprising:
monitoring, by one or more computing devices, a movement parameter associated with a component of the agricultural machine;
detecting, by the one or more computing devices, a change in the monitored movement parameter over time that is associated with a damage pattern, the damage pattern being indicative of damage to the agricultural machine; and
when it is detected that the monitored movement parameter has experienced the damage pattern, automatically initiating, by the one or more computing devices, a corrective action associated with preventing further damage to the agricultural machine, wherein automatically initiating the corrective action comprises automatically reducing a speed of the agricultural machine based on detecting the damage pattern.

14. The method of claim 13, wherein the damage pattern is indicative of at least one of a catastrophic failure event or a progressive failure event.

15. The method of claim 13, wherein the damage pattern is indicative of at least one of:
an impact with the agricultural machine;
a sudden structural failure of the agricultural machine;
an incipient structural failure of the agricultural machine; or
a plastic deformation of the agricultural machine.

16. The method of claim 13, wherein automatically initiating the corrective action comprises providing a notification to at least one of an operator or a supervisor of the agricultural machine.

17. The method of claim 13, wherein the damage pattern is represented by at least one of the following:
the monitored movement parameter increasing beyond a predetermined threshold value; or
the monitored movement parameter increasing beyond the predetermined threshold value across a first predetermined time interval, followed by a decrease in the monitored movement parameter to less than the predetermined threshold value.

18. The method of claim 13, further comprising establishing at least one of a baseline operating range or a baseline repeating pattern of the monitored movement parameter, and wherein the damage pattern is represented by the monitored movement parameter deviating from the baseline operating range or the baseline repeating pattern by at least a predetermined threshold value.

19. The method of claim 13, further comprising detecting a progressive failure trend in the monitored movement parameter, and wherein the damage pattern is represented by the progressive failure trend.

20. A system for detecting a damage condition associated with an agricultural machine, the system comprising:
a component of the agricultural machine;
a movement sensor configured to measure a movement parameter associated with the component; and
a controller communicatively coupled with the movement sensor, the controller including a processor and associated memory, the memory storing instructions that, when executed by the processor, configure the controller to:
monitor the movement parameter associated with the component;
detect a change in the monitored movement parameter over time that is associated with a damage pattern, the damage pattern being indicative of damage to the agricultural machine, wherein the damage pattern is represented by the monitored movement parameter increasing beyond a predetermined threshold value across a first predetermined time interval, followed by a decrease in the monitored movement parameter to less than the predetermined threshold value; and
when it is detected that the monitored movement parameter has experienced the damage pattern, automatically initiate a corrective action associated with preventing further damage to the agricultural machine.

* * * * *